United States Patent
Pichmann

(10) Patent No.: US 7,593,799 B2
(45) Date of Patent: Sep. 22, 2009

(54) TORQUE TRANSMISSION DEVICE

(75) Inventor: Volker Pichmann, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 448 days.

(21) Appl. No.: 11/440,391

(22) Filed: May 24, 2006

(65) Prior Publication Data

US 2006/0225938 A1 Oct. 12, 2006

Related U.S. Application Data

(63) Continuation of application No. PCT/EP2004/013182, filed on Nov. 19, 2004.

(30) Foreign Application Priority Data

Nov. 24, 2003 (DE) ................. 103 55 097

(51) Int. Cl.
*G06F 19/00* (2006.01)
*B60K 17/356* (2006.01)
*B60K 17/344* (2006.01)

(52) U.S. Cl. .................. 701/51; 701/69; 180/244; 180/248; 180/249; 477/175; 477/180

(58) Field of Classification Search ............ 701/51, 701/69; 180/244, 248, 249; 477/175, 180
See application file for complete search history.

(56) References Cited

U.S. PATENT DOCUMENTS

| | | | |
|---|---|---|---|
| 5,927,425 A * | 7/1999 | Kusano ................ | 180/248 |
| 6,842,681 B2 * | 1/2005 | Imai et al. ................ | 701/69 |
| 6,843,338 B2 * | 1/2005 | Ohtsu ................ | 180/233 |
| 7,085,640 B2 * | 8/2006 | Segawa et al. ................ | 701/67 |
| 7,346,442 B2 * | 3/2008 | Higashimata et al. ......... | 701/67 |
| 2003/0150660 A1 * | 8/2003 | Ohtsu ................ | 180/197 |
| 2005/0121277 A1 * | 6/2005 | Segawa et al. ................ | 192/3.3 |

(Continued)

FOREIGN PATENT DOCUMENTS

DE 34 27 725 A1 8/1985

(Continued)

*Primary Examiner*—Khoi Tran
*Assistant Examiner*—Ian Jen

(57) ABSTRACT

A torque transfer device in a motor vehicle, used for variable transfer of torque from a first shaft associated with a first wheel pair to a second shaft associated with a second wheel pair. A coupling unit facilitates variable torque-transferring coupling of the first and second shaft. The coupling unit has a first coupling element rotationally connected to the first shaft and a second coupling element connected to the second shaft. The elements cooperate with each other or are capable of cooperating with each other in order to transfer torque. A controllable adjusting device adjusts a strength of the interaction between the coupling elements by adjusting a relative position and/or a mechanical contact pressure. A control device controls the adjustment. The control device includes a data processing unit for calculating a first control signal on the basis of a plurality of input signals according to predefined rules and for controlling the adjusting device. A second control signal is superimposed on the first control signal. The second control signal acts as an indication of the difference in rotational speeds of the first and second shafts. A change in the second control signal on the basis of a change of this difference caused by the driving situation is chronologically in advance of a change of the first control signal caused by the same driving situation.

12 Claims, 2 Drawing Sheets

U.S. PATENT DOCUMENTS

| | | | |
|---|---|---|---|
| 2005/0278103 A1* | 12/2005 | Higashimata et al. | 701/67 |
| 2005/0278104 A1* | 12/2005 | Masuda et al. | 701/69 |
| 2007/0102207 A1* | 5/2007 | Yamanaka et al. | 180/65.3 |
| 2008/0125287 A1* | 5/2008 | Kakiuchi et al. | 477/114 |

FOREIGN PATENT DOCUMENTS

DE 197 11 719 A1 11/1997

* cited by examiner

TORQUE TRANSMISSION DEVICE

CROSS-REFERENCE TO RELATED APPLICATION

This is a continuing application of copending international application No. PCT/EP2004/013182, filed Nov. 19, 2004; the application also claims the priority, under 35 U.S.C. § 119, of German patent application No. 103 55 097.6, filed Nov. 24, 2003; the prior applications are herewith incorporated by reference in their entirety.

BACKGROUND OF THE INVENTION

Field of the Invention

The invention relates to a torque transmission device in a motor vehicle for the variable transmission of a torque from a first shaft, which is assigned to a first wheel pair, to a second shaft, which is assigned to a second wheel pair, comprising a clutch unit for variable torque-transmitting coupling of the first and second shafts, the clutch unit having at least one first clutch element which is connected in a rotation-transmitting manner to the first shaft and at least one second clutch element which is connected in a rotation-transmitting manner to the second shaft, which clutch elements are in, or can be placed in, torque-transmitting interaction with one another, controllable actuating means for setting the intensity of the interaction between the clutch elements by setting a relevant position and/or a mechanical pressing force of the clutch elements, and a control device for actuating the actuating means, the control device comprising a data processing unit which is suitable for calculating a first control signal on the basis of a plurality of input signals and in accordance with predefined rules, and for outputting said signal in order to actuate the actuating means.

A device of the foregoing type is described, for example, in U.S. Pat. No. 5,927,425 and German patent application DE 197 11 719 A1. Torque transmission devices of said type are often used in motor vehicles having four-wheel drive. In such vehicles, a first wheel pair, generally the front wheels, is primarily driven by an engine. Systems are also known wherein the rear wheels are primarily driven, as well as equivalent, so-called "hang on" all-wheel-drive solutions. The drive torque is also transmitted to the first shaft, for example by means of a front differential gearing. Said first shaft is connected to a first clutch element, for example a set of clutch disks or plates. The clutch unit serves to provide a controllable interaction between the first clutch element and a second clutch element, for example a second set of clutch disks or plates, which can be placed in interaction, or can be varied in terms of their intensity of interaction, with the first clutch element, for example by changing the relative position or the reciprocal pressing force. Any type of clutch can fundamentally be used here, for example mechanical, hydraulic or hydrodynamic clutches. A second shaft is connected in a rotation-transmitting fashion to the second clutch element, which second shaft itself is connected, for example by means of a rear differential gearing, to the second wheel pair of the motor vehicle, generally the rear wheels. A larger or smaller torque is transmitted to the second wheel pair depending on the intensity of the interaction between the clutch elements in the clutch unit. It is desired that the degree of torque transmission be made dependent on the current driving situation. The torque is varied depending on the driving situation, for example maximized during acceleration, giving high traction, and minimized during maneuvering, in order to avoid distortion of the drivetrain.

Complex actuation of the interaction between the clutch elements of the clutch unit is necessary in order to cope with the wide variety of possible driving situations. It is known to provide controllable actuating means for this purpose. In the cited document, for example, a hydraulic pressure piston device is disclosed with which the relative force between two sets of clutch disks can be varied. An electrically controllable hydraulic valve is provided in order to actuate the hydraulic pressure piston device. Adaptation to the respective driving situation is achieved by virtue of the fact that the output signals of a plurality of individual sensors, for example vehicle speed sensors, individual wheel speed sensors, longitudinal and transverse acceleration sensors, steering angle sensors etc., are used as input signals to a data processing unit. The signals can travel, for example, via the CAN-bus inside the vehicle. The data processing unit, for example a special control unit, is programmed in such a way that one control signal, which is used to actuate the hydraulic valve, is generated from the plurality of input signals in accordance with certain decision rules. Though differing from this in detail, the devices disclosed in German published patent application DE 36 26 024 A1 and in German patent No. DE 34 27 725 C2 are equivalent in terms of the basic principle.

Using the control principle explained, it has been successfully possible to adapt the transmission of torque very well to different driving situations.

This very good adaptation to the widest variety of conditions does however require the detection of a plurality of signals and the computationally intensive processing of said signals. Both are comparatively time-consuming. In particular when signals, such as, for example, the wheel speed, are not directly detected but rather are obtained as a by-product of other calculation processes in separate control units, such as, for example, an ABS control unit, the control signal lags behind the change in the actual driving situation with a time delay. In the majority of cases, however, said delay is largely negligible. However, for very sudden changes in the driving situation, for example when one individual wheel suddenly drives on to a sheet of ice or the slip of one or more wheels suddenly changes for other reasons, a more immediate adaptation of the torque distribution would be desirable.

SUMMARY OF THE INVENTION

It is accordingly an object of the invention to provide a torque transmission device, which overcomes the above-mentioned disadvantages of the heretofore-known devices and methods of this general type and which is improved in such as way as to render possible a faster adaptation of the torque distribution in critical driving situations, without losses through complexity.

With the foregoing and other objects in view there is provided, in accordance with the invention, a torque transmission device in a motor vehicle for the variable transmission of a torque from a first shaft, assigned to a first wheel pair, to a second shaft, assigned to a second wheel pair. The device comprises:

a clutch unit for variable torque-transmitting coupling of the first and second shafts, said clutch unit having at least one first clutch element connected in a rotation-transmitting manner to the first shaft and at least one second clutch element connected in a rotation-transmitting manner to the second shaft, said first and second clutch elements being disposed to be, or to be placed, into torque-transmitting interaction with one another;

controllable actuating means for setting an intensity of the interaction between said first and second clutch elements by adjusting at least one of a relative position and a mechanical pressing force of said clutch elements;

a control device for actuating said actuating means, said control device including a data processing unit configured to:

calculate a first control signal based on a plurality of input signals and in accordance with predefined rules;

superimpose a second control signal on the first control signal, the second control signal being a measure of a difference between a rotational speed of the first shaft and a rotational speed of the second shaft, wherein a change in the second control signal due to a change in the difference brought about by a given driving situation temporally precedes a change in the first control signal caused by the given driving situation; and output an output signal with the first control signal and the second control signal superposed thereon for actuating said actuating means.

In other words, the objects of the invention are achieved in that a second control signal, which is a measure of the difference between the rotational speeds of the first and second shafts, is superposed on the first control signal, a change in the second control signal on account of a change in said difference brought about by a change in the driving situation leading, in terms of time (i.e., it is chronologically before), a change in the first control signal caused by the same change in driving situation.

It is the basic concept of the present invention to actuate the actuating means by superposing two control signals which originate from different sources. Here, the first control signal can be the known complex control signal which is suitable for optimizing the distribution of torque in all driving situations which come about "slowly". In contrast, the second control signal is generated from a few input variables, in particular only the difference between the speeds of the first and second shafts, and can therefore be obtained considerably faster than the complex signal. The difference between the speeds of the first and second shafts is in this respect particularly suitable for generating the second control signal, since it is always an indication of at least one wheel having a higher level of slip than other wheels. The detection of said speed difference is, as is to be explained further below, also particularly simple and therefore fast. The present invention therefore makes possible a direct, albeit little-differentiated adaptation of the torque distribution in the event of sudden changes in driving situation. The corresponding change, which occurs after a time delay, in the complex signal then manifests itself in a fine adjustment of the torque distribution. It is indeed fundamentally possible to directly detect the difference in speed between the first and second shafts required for generating the second control signal. This would, however, require a differential gearing provided specifically for this purpose. It is therefore more favorable, as is provided in one preferred embodiment of the invention, to detect the rotational speeds of the first and second shafts by means of in each case at least one separate sensor, and to provide a comparator which detects output signals of these sensors as input signals, and supplies the second control signal as a comparator output signal. It is also alternatively possible to use one individual sensor which directly detects the difference in speed by means of an intelligent evaluation logic circuit. The components mentioned can be implemented as electric or electronic standard components, which is cost-effective and ensures freedom from maintenance.

Different strategies can be followed in the specific application. In one favorable embodiment, it is for instance provided that the sensors in each case supply an analog electrical signal which is a measure of the rotational speed of the respective shaft. In such an embodiment of the sensors, it is favorable to design the comparator as an analog differential amplifier. In this way, the time delay between entering a new driving situation and the adaptation of the second signal is minimized. In particular, no time-consuming calculations are necessary. The number of conversion operations in the signal path is also minimized. The comparator can however alternatively be designed in such a way that it comprises a digital data processing unit. Said variant is particularly favorable if the sensors are designed in such a way that they supply a digital signal. This is the case for example with Hall sensors or inductive sensors which supply an electrical pulse sequence as an output signal, the pulse frequency being proportional to the rotational speed of the respective shaft. Data of said type could be directly detected and processed by a digital comparator, so that no time-consuming calculations are required here either, and the second control signal follows the change in driving situation approximately as fast as in the purely analog case.

In order to simplify the design and to minimize the number of parts, it is favorable if the sensors are arranged in a common housing. In the case of a clutch unit having a plate drum, a dual sensor of said type can be arranged directly adjacent to said plate drum. The comparator can also favorably be provided in the same housing.

As is known from the prior art, it is particularly favorable if the actuating means for actuating the clutch device are formed as a hydraulic pressure piston configuration. Other variants such as electromotive actuating means are also equally conceivable. Electrically driven scissor-type crossbar systems and ball ramp systems, for example, are also known as actuating means in torque distributors. The basic concept of the invention remains unaffected by these. The specific use of the (overall) control signal can however be different in the respective case. In the case of the hydraulic pressure piston configuration for actuating the clutch device, it is particularly favorable to provide a hydraulic valve which can be electrically actuated and is actuated by the control signal in order to control the hydraulic pressure piston configuration. Although volume-flow-proportional hydraulic valves can fundamentally be used, it is provided in one particularly favorable embodiment of the invention to design the hydraulic valve as a force-proportional valve.

As an alternative to actuating the pressure piston configuration by means of a hydraulic valve, it can be provided in another embodiment of the invention to use the second control signal directly to actuate a hydraulic pump. In many cases, however, said variant would have a time delay relative to the valve variant, since the relatively high current of the pump motor must be varied here. Further features and advantages of the present invention emerge from the following specific description and the drawings, wherein:

DESCRIPTION OF THE PREFERRED EMBODIMENTS

Figure 1:
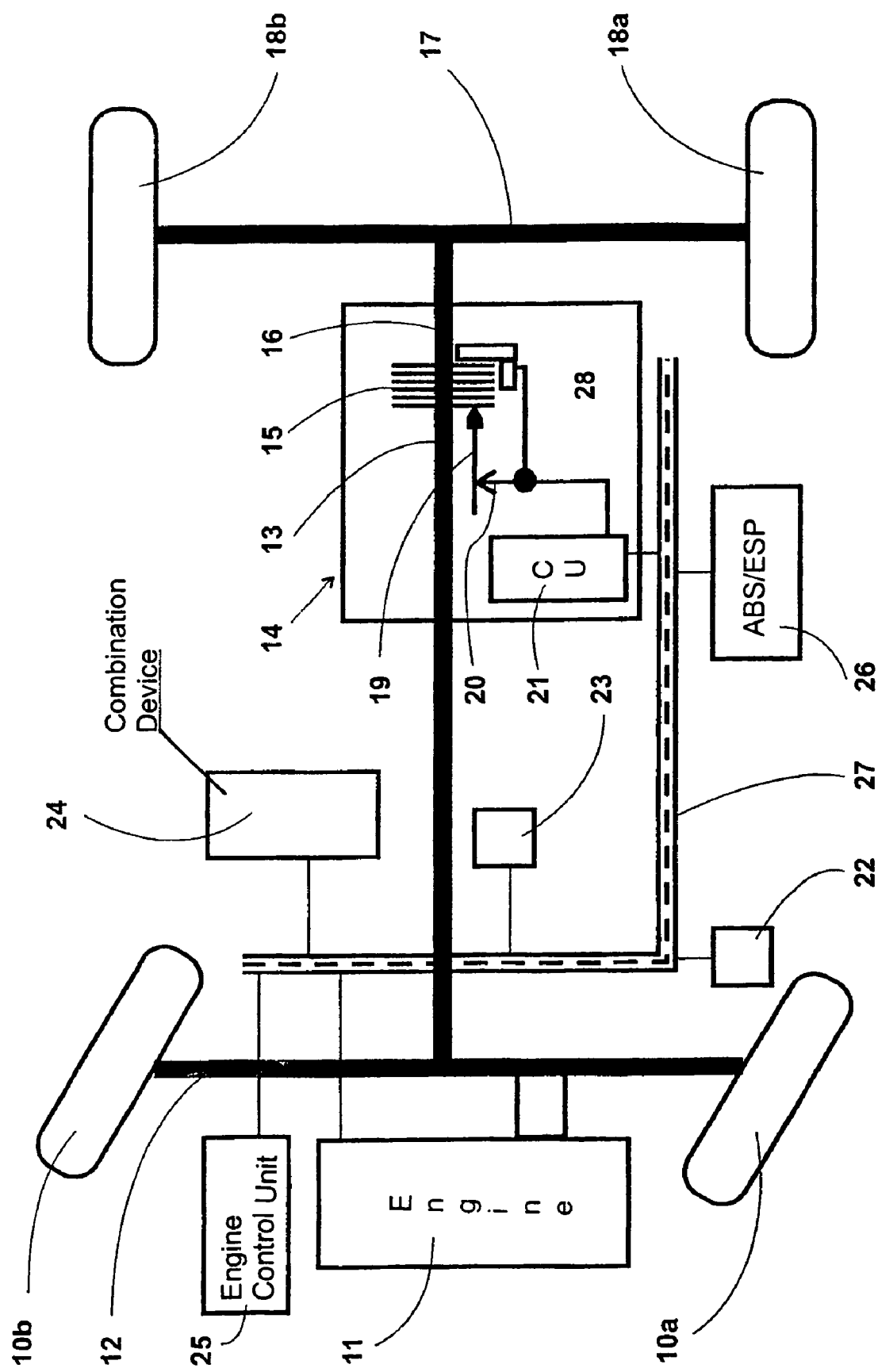
FIG. 1 shows a simplified schematic illustration of the drivetrain and some signal paths for actuating a torque distributor in a motor vehicle.

Referring now to the figures of the drawing in detail and first, particularly, to FIG. 1 thereof, there is shown a schematic and highly simplified illustration of the drivetrain and some signal paths of a motor vehicle with all-wheel (four-wheel) drive. A first wheel pair 10a, 10b (front wheels) is driven directly by an engine 11. The rotation of the axle 12 which connects the wheel pair 10a, 10b is transmitted, by way of a non-illustrated differential gearing, to a first shaft 13 which constitutes the input shaft of a torque transmission device 14 according to the invention. The torque of the input shaft 13 is partially transmitted to an output shaft 16 by means of a clutch unit 15. The output shaft 16 drives an axle 17 via a differential gearing (likewise not illustrated). The axle 17 connecting a second wheel pair 18a, 18b (rear wheels). A larger or smaller part of the torque of the input shaft 13 is transmitted to the output shaft 16 depending on the setting of the clutch unit 15.

The clutch unit 15, which in the exemplary embodiment shown is embodied as a plate drum having clutch plates which are arranged such that they interleave with one another, is actuated by means of a hydraulic pressure piston 19 which is indicated merely as an arrow in FIG. 1. As is known from the prior art, a control unit (CU) 21 which is assigned to the torque distributor 14 is provided in order to control the valve 20.

The control unit 21 uses a plurality of input signals which are supplied to it by various sensors of the motor vehicle, for example a steering angle sensor 22, a brake sensor 23, the combination device 24, the engine control unit 25, the ABS-ESP control unit 26 etc. In the exemplary embodiment shown, the sensors/control units are each connected to the CAN bus 27, to which the torque distributor control unit 21 is also connected. From said signals, and in accordance with complex decision rules, the torque distributor control unit calculates a complex control signal for actuating the control valve 20.

According to the invention, a second control circuit 28 is assigned parallel to the first control circuit. The second control circuit 28 generates a second control signal which is superposed on the first control signal generated by the first control circuit. The control valve is therefore actuated by way of the superposition of the first and second control signals. For the explanation of the second control circuit according to the invention, reference is had to FIG. 2.

Figure 2:
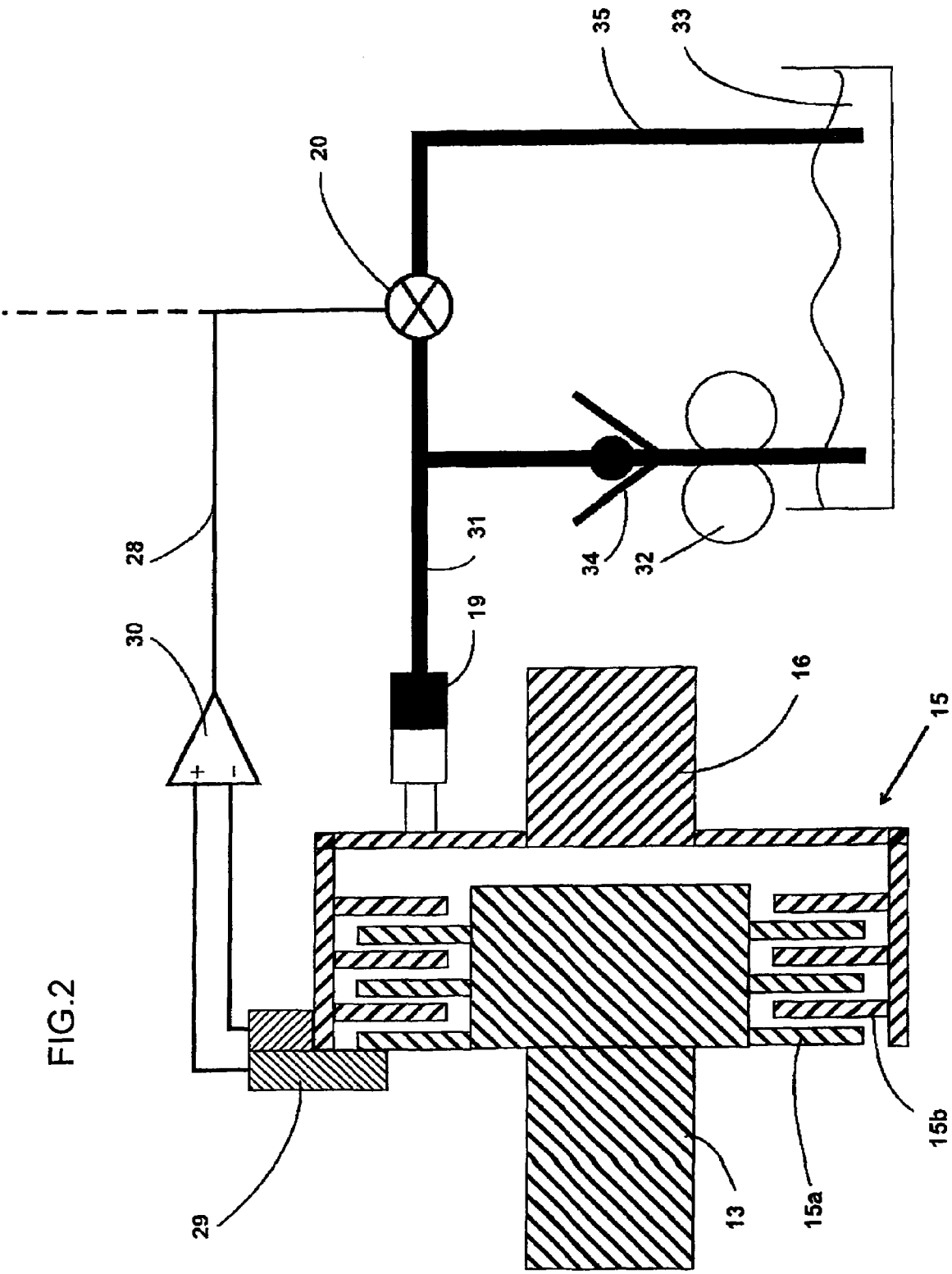
FIG. 2 shows a simplified schematic illustration of a torque distributor and its actuation by means of the second control signal.

FIG. 2 shows a schematic and highly simplified illustration of the clutch unit 15 and parts of its actuating configuration. In the exemplary embodiment shown, the clutch unit 15 is embodied as a plate drum wherein clutch disks 15a, 15b can interact with one another. The clutch disks 15a, 15b being arranged such that they interleave with one another, being respectively assigned to the input shaft 13 and the output shaft 16 and being connected in a rotation-transmitting fashion to said shafts. In the exemplary embodiment shown, the intensity of interaction is effected by means of a hydraulic pressure piston 19 which is connected, via a pressure line 31, to a pump 32 which is fed from a hydraulic fluid reservoir 33. In the exemplary embodiment shown, the pressure line 31 and the pump 32 are connected in a known fashion by means of a non-return valve 34. Alternative solutions can be used in other embodiments. The pressure line 31 is also connected, by means of a control valve 20 which can be electrically actuated, to a return line 35 which can feed hydraulic fluid back to the fluid reservoir 33 in a regulated manner. Given constant pump power, the pressure in the pressure line 31 and thus the intensity of interaction between the clutch disks 15a and 15b can be set by varying the valve opening 20.

As already explained, part of the control signal for the valve 20 originates from the torque distributor control unit 21. Said connection is indicated by dashed lines in FIG. 2. According to the invention, a second control circuit 28 is provided which has a dual speed sensor 29 which measures the respective speeds of the input shaft 13 and of the output shaft 16 and outputs a corresponding signal. In the present case, the output signals of the dual speed sensor 29 are analog voltage levels which, in a defined way, are a measure of the respective shaft speeds. In the exemplary embodiment shown, said signals are supplied to a comparator embodied as a differential amplifier 30, which generates a corresponding difference signal which constitutes a measure of the speed difference between the first and second shafts. Said comparator output signal is superposed, as a second control signal, on the first control signal and together with the latter forms the overall control signal for the valve 20.

On account of the low number of input signals and the fast analog processing in the analog differential amplifier 30, the second control signal follows a change in the difference in speed between the shafts 13 and 16 almost without a time delay. At the same time, the difference in speed between the shafts 13 and 16 is a direct measure of slip of at least one wheel, without an exact analysis of other measurement values being necessary in order to detect this situation. In the event of a sudden change in the driving situation, for example when a wheel suddenly travels onto a low-friction underlying surface and exhibits increased slip, the second control signal changes immediately and directly initiates a compensating change in the torque distribution by correspondingly actuating the valve 20. The same change in the driving situation is of course also detected by the torque distributor control unit 21 which, however, for this purpose must also receive a plurality of input signals and calculate them in accordance with complex decision rules. A correspondingly adapted control signal for the valve 20 can therefore only be generated with a time delay. At this point in time, however, suitable compensation has already been initiated by means of the inner control circuit. The change in the first control signal therefore only has an effect as a fine adjustment of the torque distribution. It is possible by virtue of the present invention to obtain a significant shortening of the response time of the torque distribution to sudden changes in the driving situation by means of the second control signal according to the invention, without the complexity of adaptation of the torque distribution to respective driving situations by means of the first control signal being adversely affected.

The present invention has been presented on the basis of one specific exemplary embodiment. A plurality of variations are however conceivable within the scope of the invention. By way of example, the required pressure variation in the pressure line 31 can take place by means of direct actuation of the pump 32 instead of the valve 20. It is also fundamentally possible to actuate the clutch unit 15 in a manner other than hydraulically, for example electromotively. Furthermore, the implementation of the clutch device is not restricted to the plate drum shown. Other forms of clutch, for example hydrodynamic clutches or similar, can likewise be used. In addition, the second control circuit 28 is not restricted to the analog form shown in FIG. 2. In particular using sensors which generate a pulse sequence as an output signal, the relevant speed difference between the input shaft 13 and the output shaft 16 can be determined digitally with a similar speed to that in the case of the illustrated analog form. The digital data processing unit necessary here can, for example, be provided in the torque distributor control unit 21 or else separately.

I claim

1. A torque transmission device in a motor vehicle for the variable transmission of a torque from a first shaft, assigned to a first wheel pair, to a second shaft, assigned to a second wheel pair, the device comprising:
    a clutch unit for variable torque-transmitting coupling of the first and second shafts, said clutch unit having at least one first clutch element connected in rotation-transmitting manner to the first shaft and at least one second clutch element connected in a rotation-transmitting manner to the second shaft, said first and second clutch elements being disposed to be, or to be placed, into torque-transmitting interaction with one another;
    controllable actuating means for setting an intensity of the interaction between said first and second clutch elements by adjusting at least one of a relative position and a mechanical pressing force of said clutch elements;
    a control device for actuating said actuating means, said control device including a data processing unit configured to:
        calculate a first control signal based on a plurality of input signals and in accordance with predefined rules;
        superimpose a second control signal on the first control signal, the second control signal being a measure of a difference between a rotational speed of the first shaft and a rotational speed of the second shaft, wherein a change in the second control signal due to a change in the difference brought about by a given driving situation temporally precedes a change in the first control signal caused by the given driving situation; and
        output an output signal with the first control signal and the second control signal superposed thereon for actuating said actuating means.

2. The device according to claim 1, which comprises at least two separate sensors for detecting the respective rotational speeds of the first and second shafts, and a comparator connected to receive output signals from said sensors and to output the second control signal in the form of a comparator output signal.

3. The device according to claim 2, wherein said sensors supply an analog electrical signal forming a measure of the rotational speed of the respective shaft.

4. The device according to claim 2, wherein said comparator is an analog differential amplifier.

5. The device according to claim 2, wherein said comparator comprises a digital data processing unit.

6. The device according to claim 2, wherein at least one of said sensors comprises a Hall element or an inductive sensor.

7. The device according to claim 2, wherein said sensors are disposed in a common housing.

8. The device according to claim 1, wherein said actuating means comprise a hydraulic pressure piston configuration.

9. The device according to claim 8, which comprises an electrically actuated hydraulic valve disposed to control said hydraulic pressure piston configuration.

10. The device according to claim 9, wherein said hydraulic valve is a force-proportional valve.

11. The device according to claim 8, which comprises an electrically actuated hydraulic pump disposed to control said hydraulic pressure piston configuration.

12. The device according to claim 1, wherein the second control signal is generated outside of the data processing unit.

* * * * *